United States Patent [19]
Haley et al.

[11] Patent Number: 5,493,619
[45] Date of Patent: Feb. 20, 1996

[54] NORMALIZATION METHOD FOR ELIMINATING FALSE DETECTIONS IN SIDE SCAN SONAR IMAGES

[76] Inventors: Paul H. Haley, 176 Monticello Dr., Monroeville, Pa. 15146; John E. Gilmour, 5729 Oakhill Rd., Gibsonia, Pa. 15044

[21] Appl. No.: 209,095

[22] Filed: Mar. 11, 1994

[51] Int. Cl.$^6$ ..................................................... G06K 9/00
[52] U.S. Cl. .................. 382/1; 367/88; 367/131; 382/22; 382/54
[58] Field of Search ...................... 382/1, 14, 15, 382/22, 54; 395/21; 348/163; 367/131, 88, 93

[56] References Cited

U.S. PATENT DOCUMENTS

| | | | |
|---|---|---|---|
| 4,115,761 | 9/1978 | Ueda et al. | 340/146.3 |
| 4,363,104 | 12/1982 | Nussmeier | 364/515 |
| 4,747,149 | 5/1988 | Umeda et al. | 382/18 |
| 4,790,027 | 12/1988 | Scherl | 382/54 |
| 4,803,736 | 2/1989 | Grossberg et al. | 382/22 |
| 4,907,156 | 3/1990 | Dol et al. | 364/413 |
| 4,958,375 | 9/1990 | Reilly et al. | 382/14 |
| 4,965,725 | 10/1990 | Rutenberg | 364/413.1 |
| 5,003,618 | 3/1991 | Meno | 382/54 |
| 5,018,215 | 5/1991 | Nasr et al. | 382/15 |
| 5,060,278 | 10/1991 | Fukumizu | 382/14 |
| 5,065,444 | 11/1991 | Garber | 382/54 |
| 5,181,254 | 1/1993 | Schweizer et al. | 382/1 |
| 5,214,744 | 5/1993 | Schweizer et al. | 382/14 |

OTHER PUBLICATIONS

Schweizer et al., "Automatic Target Detection And Cuing System For An Autonomous Underwater Vehicle (AUV)", 6th Sym. Unmanned, Untethered Submersibles, Oct. 1989.

S. Y. Kung et al., "A Unified Systolic Architecture For Artificial Neural Networks", Journal Of Parallel And Distributed Computing 6, 358–387 (1989).

Pomerleau et al., "Neural Network Simulation At Warp Speed: How We Got 17 Million Connections Per Second", Proc. 1988 IEEE Int'l. Conf. on Neural Networks.

"An Artificial Neural Network Accelerator Using General Purpose 24–Bits Floating Point Digital Signal Processors", Proc. 1989 IEEE Int'l. Joint Conf. On Neural Networks.

P. F. Schweizer et al., "Image Processing Architectures For Autonomous Underwater Vehicles (AUVs) In Mine Detection And Classification Operations," Jul. 1991.

*Primary Examiner*—Leo H. Boudreau

[57] ABSTRACT

A method for eliminating false detections at the water column boundary in side scan sonar images is provided. Each image is filtered by computing the median greylevel value of a pixel and its four adjacent pixels to produce a median image. The median image is filtered with a first linear filter to produce an edge image. The edge image is then filtered with a second linear filter to produce an edge-smoothed image. The edge of the image is detected by searching each row of the edge-smoothed image for the maximum greylevel. A transition region is defined between the detected edge and a preselected right boundary and the average greylevels over the rows and columns in this transition region is computed. The sonar image is then normalized by computing the image mean grayness level of each pixel in the image.

16 Claims, 3 Drawing Sheets

```
      X
   X  C  X
      X
```

NORMALIZATION METHOD FOR ELIMINATING FALSE DETECTIONS IN SIDE SCAN SONAR IMAGES

BACKGROUND OF THE INVENTION

1. Field of the Invention

This invention relates to a system for detecting man made objects and natural features in sonar imaging and, more particularly, to a method for eliminating false target detections at the water column boundary in side scan sonar images.

2. Description of the Prior Art

Side scan sonars are used to create a sound reflectance image of the ocean bottom using short bursts of high frequency energy. A linear receiving array forms a narrow vertically oriented fan beam to receive the reflected energy. The delay time between the energy bursts or pings and the reflected energy sweeps a single line at a time of the image in range. The forward motion of the platform supporting the sonar lays down parallel raster lines of the image in the track direction.

In the water column region of the image, where it is too early for returns from the bottom, suspended objects image as highlights. In the near range zone at relatively high grazing angles, objects on the bottom image as highlights or highlights followed by short shadows. In the far range region, objects usually image as highlights followed by long shadows where the beam has been blocked from the ocean floor by the object.

Since the attenuation of the signal is as much as 70db between near and far range, modern sonars use a time varying gain (TVG) to compensate. In addition to this open loop compensation, a second form of gain control using feedback is applied by dividing the image into range segments and adjusting the gain within each range segment to yield an average level of intensity. This form of gain adjustment often yields undesirable anomalous effects such as shadows in the track direction after a bright object has been imaged.

Skilled sonar operators when using side scan sonar images to look for mines can compensate for most of these anomalous effects and readily distinguish the water column region from the ocean floor region of the image. When automatic detection methods are applied, however, preprocessing of the image is necessary to remove certain image anomalies before the detection process is run. In addition, certain image structures that degrade automatic detection algorithms must be eliminated.

Because of the high amount of noise and low resolution in sonar images, attempts to automate the mine detection process have been only moderately successful. In addition to an already difficult situation, anomalies introduced by the first stages of processing complicate the problem even more. Automatic detection processes employ some form of spatial differentiation of the image to detect highlight and shadow regions that are likely to correspond to mines as well as other things such as rocks. These detection methods often give false alarms at the boundary between the water column and the first return from the ocean floor. False alarms also occur whenever artifacts such as bands are introduced into the image due to unsophisticated normalization techniques. Accordingly, there is a need for an automated process that eliminates false detections at the water column boundary.

SUMMARY OF THE INVENTION

The present invention overcomes these prior art problems by eliminating the abrupt transition between the water column and the ocean floor region. It does this while preserving highlights in the water column that could correspond to targets. It also eliminates the bright bands that occur at this boundary in the image when simple smoothing techniques are used to normalize image intensity. The present invention accomplishes this by equalizing the water column mean greylevel to that of the whole image.

A system for eliminating false detections at the water column boundary in side scan sonar images is provided. These sonar images consist of a matrix of pixels, each pixel having a known greyness level.

Each sonar image is filtered by computing the median greylevel value of a pixel and its four adjacent pixels to produce a median image. This median image is filtered with a first linear filter to produce an edge image. The edge image is then filtered with a second linear filter to produce an edge-smoothed image.

The edge is detected by searching each row of the edge-smoothed image for the maximum greylevel. A transition region between the detected edge and a preselected right boundary is then defined and the average greylevels over the rows and columns in the transition region is computed. Finally, the image is normalized by computing the image mean greyness level of each pixel in the image.

Preferably, at least three iterations of the median filtering are performed before the median image is filtered by the first linear filter.

The image normalization is preferably performed over three separate regions of said image. The water column region of the image is normalized to have a constant mean. The segments of the image between the water column and the right boundary are normalized by a sliding mean that interpolates the segment means. Finally, the region to the right of the right boundary is normalized by the mean computed from a moving average. Preferably, an odd number of columns is used for this normalization.

DETAILED DESCRIPTION OF THE PREFERRED EMBODIMENTS

The present invention is a system that eliminates false detections at the boundary between the sonar returns from the water column and the sonar returns from the ocean bottom. It also corrects for anomalies introduced by the automatic gain control of certain side scan sonars at this boundary. In the following description of the invention, it is assumed that the rectangular image has been normalized as a starboard image. Certain techniques known in the art can be used to convert a port image into a starboard image.

Figure 1:
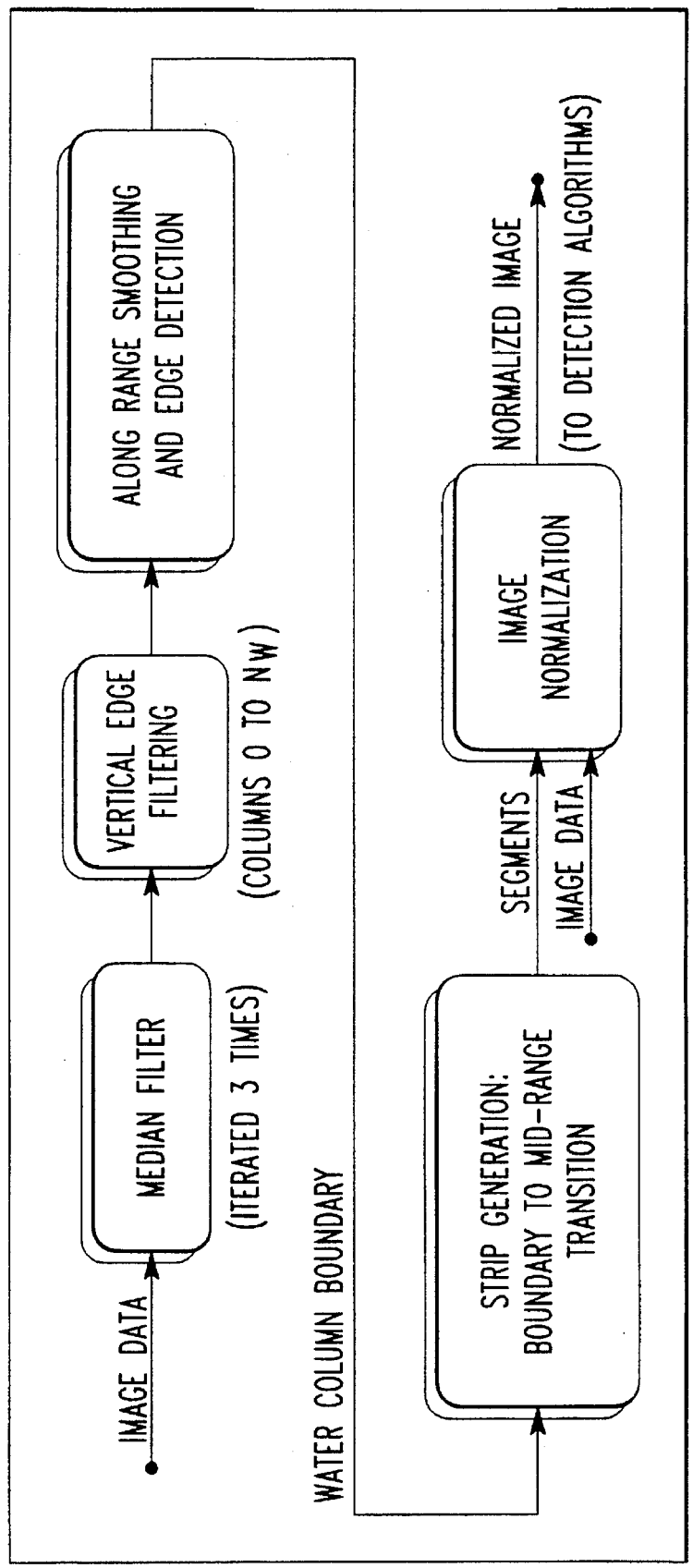
FIG. 1 is a functional block diagram showing the presently preferred system for eliminating false detections at the water column boundary.

The present system, as shown in FIG. 1, include five basic modules. The five basic modules of the invention are:

1. Median filtering;
2. Vertical edge filtering;
3. Smoothing of boundary and edge detection;
4. Strip generation in transition zone; and
5. Image Normalization.

Figures 2, 3:
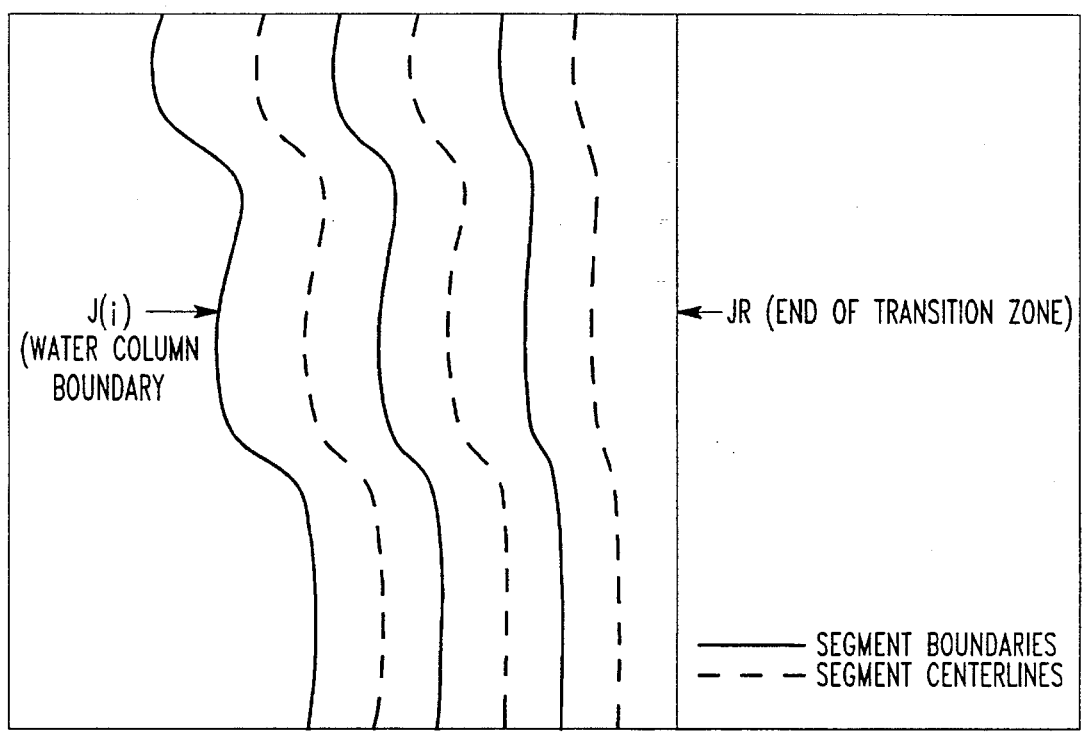
FIG. 2 is a block diagram showing the median filter used in the system shown in FIG. 1.
FIG. 3 is a schematic drawing showing the segment boundaries and centerline definitions used in generating the boundary to mid-range transition used in the system shown in FIG. 1.

A median filter, as shown in FIG. 2, computes the median grey level value of a pixel and its four nearest neighbors. The median filter makes a new image using this median value for the greylevel of the center pixel. This process is repeated three times sequentially so that the last image produced is the result of three filtering processes. Median filtering removes spurious noise and spikes in the image while preserving edges.

A linear filter represented as the following matrix $h_1$:

$$h_1 = [-1 -1 -1 -1 \; 0 \; 1 \; 1 \; 1 \; 1],$$

is convolved with the previous image to produce an edge image. A second linear filter represented as the following matrix $h_2$:

$$h_2 = \begin{bmatrix} 1 \\ 1 \\ 1 \\ 1 \\ 1 \\ 1 \\ 1 \end{bmatrix}$$

is convolved with the edge image to smooth the edge.

The image boundary is produced by searching each row of the image for the maximum greylevel in the edge smoothed image in columns O to $N_W$ where $N_W$ depends on expected altitude. This produces the edge $J(i)$ where $i$ is the row index and $J(i)$ is the column position of the boundary. The filter $h_2$ with $2n+1$ elements (in this example $n=3$) yields an image with undefined row borders of $n$ pixels wide. Hence $J(n+1)$ is extended over the first $n$ rows and $J(N_R-n)$ is extended over the last $n$ rows to define the boundary across all $N_R$ rows of the image.

As shown in FIG. 3, adjacent strips are defined in a transition zone between the boundary $J(i)$, and a vertical right boundary JR displaced a certain amount to the right of $J(i)$. The following parameters define the transition region for a starboard image:

| | |
|---|---|
| $J(i)$ | Left boundary between water column and first return from the bottom; |
| JR | Right boundary of transition zone; |
| $B(i,k)$ | $k^{th}$ boundary between segment k-1 and k; |
| $C(i,k)$ | Center line of segment k; |
| $\mu_k$ | Mean greylevel value of segment k; |
| $N_S$ | Number of segments between $J(i)$ and JR; and |
| $N_A$ | Minimum width of segments. |

Each segment is defined by boundaries $B(i,k-1)$ and $B(i,k)$. The number of segments is a function of the variation of $J(i)$ in the range.

To determine the segment boundaries, let $$MAXJ = \frac{\text{maximum}}{i} [J(i)];$$

$$MINJ = \frac{\text{minimum}}{i} [J(i)];$$

$$DELJ = MAXJ - MINJ; \text{ and}$$
$$D = \text{maximum}[N_A, DELJ];$$

wherein DELJ is the width of a vertical strip that just contains the function $J(i)$. D is chosen to be at least $N_A$ pixels wide or DELJ, whichever is larger. Now $$N_S = \text{integer} \left[ \frac{D + N_A - 1}{N_A} \right], \text{ the number of segments,}$$

and
$$JR = MAXJ + N_A N_S,$$

so that each segment is at least $N_A$ pixels wide but no greater than $2N_A$ pixels wide at any point in the range. With $J(i)$, JR and $N_S$ defined, the segment boundaries are:

$$B(i,k) = J(i) + \text{integer} \left[ \frac{k(JR - J(i))}{N_S} + 0.5 \right],$$

$k=0$ to $N_S$ with $B(i,0)=J(i)$ and $B(i, N_S)=JR$.

The center lines of the segments are given by the average of the segment boundaries:

$$C(i,k) = \text{integer} [½(B(i,k)+B(i,k+1))+0.5]$$

for segments $k=0$ to $N_S-1$.

The segment means, $\mu_k$, are computed by averaging the greylevels over rows 1 to $N_R$ and over columns $j$ satisfying the relationship:

$$B(i,k) \leq j < B(i,k+1)$$

for segments $k=O$ to $k=N_S-1$.

Once these parameters have been computed, the image is normalized. The image mean $\mu_I$ is computed over all the pixels in the image. Image normalization is done over three different regions of the image using six different rules. The water column region is normalized to have a constant mean. The segments between the water column and the right boundary JR are normalized by a sliding mean that interpolates the segment means. The image to the right of JR is normalized by the mean computed from a moving average using $2a+1$ columns of the image. Let $I_o(i,j)$ be the original unfiltered greylevel image for $1 \leq i \leq N_R$, $1 \leq j \leq N_C$ and $I_N(i,j)$ the desired normalize image.

The six normalization procedures are:

A Water column: $1 \leq j < J(i)$
$I_N(i,j) = \text{maximum}[\mu_I, I_o(i,j)]$
B First half of first segment: $k = 0$
$B(i,0) \leq j < C(i,0)$
$I_N(i,j) = (\mu_I/\mu_o) I_o(i,j)$
C Middle segments: $k = 0$ to $N_S - 1$
$C(i,k) \leq j < C(i,k+1)$
For $i$ and $k$ fixed, determined interpolation parameters:
$\Delta J = C(i,k+1) - C(i,k)$
$DJ = j - C(i,k)$
$\mu(i,j) = \mu_k + (DJ/\Delta J)(\mu_{k+1} - \mu_k)$
$I_N(i,j) = (\mu_I/\mu(i,j)) I_o(i,j)$
D Last half of last segment: $k = N_S - 1$
$C(i, N_S - 1) \leq j < JR + a$ Moving average function:
Let $\mu_M(j)$ be the average of the image for
$1 \leq i_M \leq N_R$ and for
$j-a \leq j_M \leq j+a$.
In other words $\mu_M(j)$ is the average over a strip $2a+1$ columns wide centered at index $j$ and extending over all rows.

For a fixed value of i, the interpolation parameters are determined.

Figure 4:
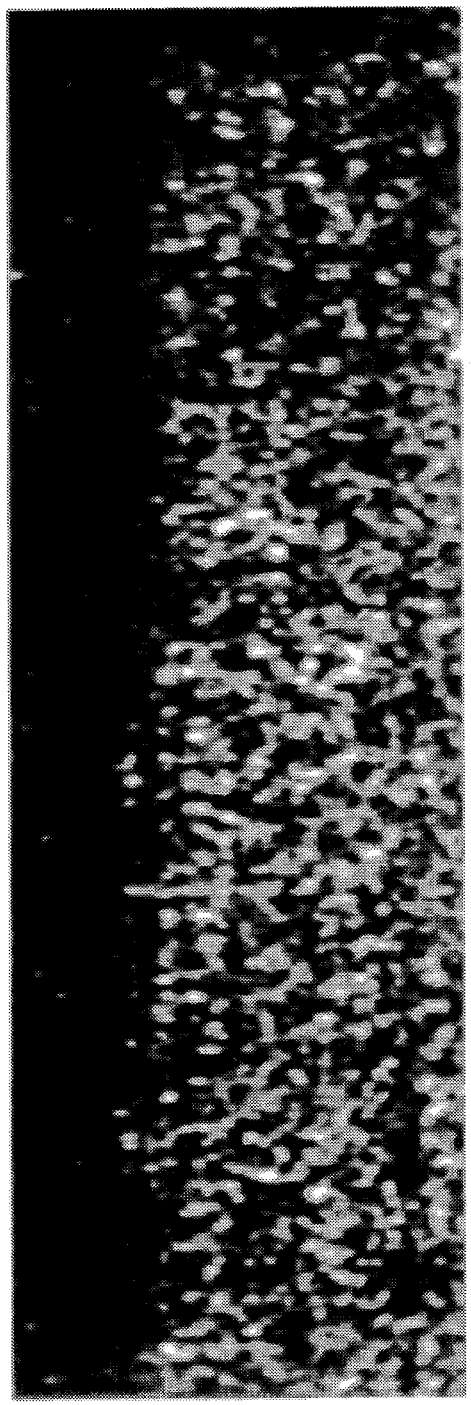
FIG. 4 is a representation of an unnormalized sonar image showing the water column and boundary.
Figure 5:
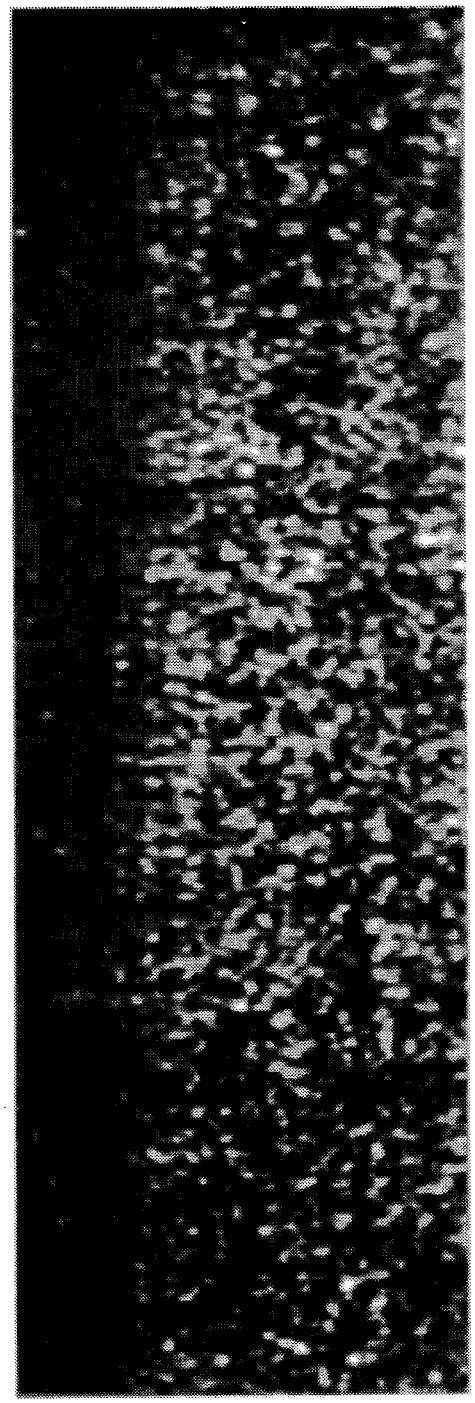
FIG. 5 is a representation of the image of FIG. 4 which has been normalized with the water column mean equalized to the image mean.

$\Delta J = JR + a - C(i, N_S - 1)$ $DJ = j - C(i, N_S - 1)$ $\mu(i,j) = \mu_{N_S-1} + (DJ/\Delta J)(\mu_M(JR+a) - \mu_{N_S-2})$ $I_N(i,j) = (\mu_I/\mu(i,j)) I_o(i,j)$ E Moving average part:
$JR + a \leq j < N_C - a$
$I_N(i,j) = (\mu_I/\mu_M(j)) I_o(i,j)$
F Right strip of image:
$N_C - a \leq j \leq N_C$
$I_N(i,j) = (\mu_I/\mu_M(N_C - a)) I_o(i,j)$ These rules produce a normalized image in which the water column boundary discontinuity is suppressed while retaining highlights in the water column. The overall image is normalized to have a constant local mean with respect to the range. FIG. 4 shows an unnormalized sonar image with a noticeable water column. The same image is shown in FIG. 5 where the method set forth above has been applied to equalize the water column mean greylevel to that of the whole image.

The present system offers several advantages over the prior art. Notably, false detections at the boundary are eliminated since the water column region and the ocean floor region are adjusted to have the same mean. Moreover, the probability of correct target detection is increased since anomalous bright bands introduced by automatic gain of sonar hardware are renormalized to image mean. This reduces artificial contrast variation across the image and thus eliminates bias error in computing target cuer thresholds. In addition, the probability of detecting targets in the water column remains high since highlights in water column are not disturbed by the normalization process.

In the foregoing specification certain preferred practices and embodiments of this invention have been set out, however, it will be understood that the invention may be otherwise embodied within the scope of the following claims.

We claim:

1. A method for eliminating false detections at the water column boundary in side scan sonar images consisting of a matrix of pixels, each pixel having a known greyness level, comprising the steps of:
   a. filtering each image by computing the median greylevel value of a pixel and its four adjacent pixels to produce a median image;
   b. filtering said median image with a first linear filter to produce an edge image;
   c. filtering said edge image with a second linear filter to produce an edge-smoothed image having a plurality of rows and columns;
   d. detecting the edge by searching each row of said edge-smoothed image for the maximum greylevel;
   e. defining a transition region between said detected edge and a preselected right boundary, said transition region having a plurality of rows and columns, and computing the average greylevels over the rows and columns in said transition region; and
   f. normalizing the image by computing the image mean greyness level of each pixel in the image.

2. The method of claim 1 wherein at least three iterations of said median filtering are performed before said median image is filtered by said first linear filter.

3. The method of claim 1 wherein segments are defined in the transition region between said detected edge and said right boundary and the average greylevel of the segments are computed.

4. The method of claim 3 wherein said image normalization is performed over three separate regions of said image.

5. The method of claim 4 wherein one of said three separate regions of said region is a water column region and the water column region of said image is normalized to have a constant greylevel mean.

6. The method of claim 4 wherein the greylevel of said segments between said water column boundary and said right boundary are normalized by a sliding mean that interpolates the greylevel means of said segments.

7. The method of claim 4 wherein the region to the right of said right boundary is normalized by a greylevel mean computed from a moving average.

8. The method of claim 7 wherein said moving average is computed using an odd number of columns.

9. A system for eliminating false detections at the water column boundary in side scan sonar images consisting of a matrix of pixels, each pixel having a known greyness level, comprising:
   a. a median filter which computes the median greylevel value of a pixel and its four adjacent pixels and produces a median image;
   b. a first linear filter which receives said median image and produces an edge image;
   c. a second linear filter which receives said edge image and produces an edge-smoothed image having a plurality of rows and columns;
   d. edge detecting means which searches each row of said edge-smoothed image for the maximum greylevel;
   e. means for defining a transition region between said detected edge and a preselected right boundary, said transition region having a plurality of rows and columns and computing the average greylevels over the rows and columns in said transition region; and
   f. means for normalizing the image by computing the image mean greyness level of each pixel in the image.

10. The system of claim 9 wherein at least three iterations of said median filtering are performed before said median image is filtered by said first linear filter.

11. The system of claim 9 including means for defining segments in the transition region between said detected edge and said right boundary and computing the average greylevel of the segments.

12. The system of claim 11 wherein said image normalization is performed over three separate regions of said image.

13. The system of claim 12 wherein one of said three separate regions of said region is a water column region and the water column region of said image is normalized to have a constant greylevel mean.

14. The system of claim 12 wherein the greylevel of said segments between said water column boundary and said right boundary are normalized by a sliding mean that interpolates the greylevel means of said segments.

15. The system of claim 12 wherein the region to the right of said right boundary is normalized by a greylevel mean computed from a moving average.

16. The system of claim 15 wherein said moving average is computed using an odd number of columns.

* * * * *